US008976296B2

(12) United States Patent
Ichifuji et al.

(10) Patent No.: US 8,976,296 B2
(45) Date of Patent: *Mar. 10, 2015

(54) BROADCASTING AND COMMUNICATION RECEIVER APPARATUS

(75) Inventors: Yasuhisa Ichifuji, Fujisawa (JP); Takehito Kishi, Yokohama (JP); Naoko Saito, Tokyo (JP); Satoru Takashimizu, Yokohama (JP); Takanori Eda, Yokohama (JP)

(73) Assignee: Hitachi Maxell, Ltd., Osaka (JP)

(*) Notice: Subject to any disclaimer, the term of this patent is extended or adjusted under 35 U.S.C. 154(b) by 16 days.

This patent is subject to a terminal disclaimer.

(21) Appl. No.: 13/220,051

(22) Filed: Aug. 29, 2011

(65) Prior Publication Data

US 2012/0062795 A1    Mar. 15, 2012

Related U.S. Application Data

(63) Continuation of application No. 11/502,403, filed on Aug. 11, 2006, now Pat. No. 8,009,233, which is a
(Continued)

(30) Foreign Application Priority Data

Apr. 19, 1996 (JP) .................................. 08-097993

(51) Int. Cl.
*H04N 5/445* (2011.01)
*H04N 5/44* (2011.01)
(Continued)

(52) U.S. Cl.
CPC ......... *H04N 5/4401* (2013.01); *H04N 5/44543* (2013.01); *H04N 7/0884* (2013.01);
(Continued)

(58) Field of Classification Search
USPC ......... 348/563–565, 569, 561, 406, 461, 468, 348/731, 725, 734; 725/39, 40, 43, 56
IPC ..................................................... H04N 5/445
See application file for complete search history.

(56) References Cited

U.S. PATENT DOCUMENTS

| 5,136,505 A | 8/1992 | Inamouri et al. |
| 5,155,806 A | 10/1992 | Hoeber et al. |

(Continued)

FOREIGN PATENT DOCUMENTS

| CN | 1119390 A | 3/1996 |
| DE | 4121506 | 1/1992 |

(Continued)

OTHER PUBLICATIONS

Digital Satellite Receiver-Operating Instructions, SAT-B1, 3-800-183-21 (1), p. 25, Sony Corporation®, 1995.
(Continued)

*Primary Examiner* — Trang U Tran
(74) *Attorney, Agent, or Firm* — Baker Botts L.L.P.

(57) ABSTRACT

A digital receiver including: a receiver; a decoder; and a display controller, with a display having a first display zone displaying at least a part of the title included in program information and a second display zone displaying an entirety of the title, under control of the display controller; wherein the display controller includes an input data amount calculator calculating an amount of input data for the first display zone inputted from memory, and a comparator to compare the amount calculated with an amount of displayable data, and when the amount of the input data is larger than the amount of the displayable data, a part of the title and a symbol indicative of omission are displayed, and when the first display zone is selected, an entirety of the title in the selected first display zone is displayed in the second display zone.

19 Claims, 7 Drawing Sheets

Related U.S. Application Data continuation of application No. 10/773,307, filed on Feb. 9, 2004, now Pat. No. 7,289,158, which is a continuation of application No. 09/418,822, filed on Oct. 15, 1999, now Pat. No. 7,158,188, which is a continuation of application No. 08/844,431, filed on Apr. 18, 1997, now Pat. No. 6,037,995.

(51) Int. Cl.
*H04N 7/088* (2006.01)
*H04N 21/431* (2011.01)
*H04N 21/434* (2011.01)
*H04N 21/482* (2011.01)
*H04N 21/84* (2011.01)

(52) U.S. Cl.
CPC ......... *H04N7/0887* (2013.01); *H04N 21/4312* (2013.01); *H04N 21/4348* (2013.01); *H04N 21/482* (2013.01); *H04N 21/84* (2013.01); *H04N 5/44504* (2013.01)
USPC ............................ 348/563; 348/564; 348/569

(56) References Cited

U.S. PATENT DOCUMENTS

| | | | |
|---|---|---|---|
| 5,177,598 A | 1/1993 | Jeong | |
| 5,353,121 A | 10/1994 | Young | |
| 5,465,385 A | 11/1995 | Ohga et al. | |
| 5,473,609 A | 12/1995 | Chaney | |
| 5,479,268 A | 12/1995 | Young et al. | |
| 5,559,548 A | 9/1996 | Davis et al. | |
| 5,559,549 A | 9/1996 | Hendricks et al. | |
| 5,585,838 A | 12/1996 | Lawler et al. | |
| 5,592,551 A | 1/1997 | Lett et al. | |
| 5,596,373 A | 1/1997 | White et al. | |
| 5,602,563 A | 2/1997 | Chang et al. | |
| 5,629,733 A | 5/1997 | Youman et al. | |
| 5,635,978 A | 6/1997 | Alten et al. | |
| 5,677,708 A | 10/1997 | Matthews, III et al. | |
| 5,726,702 A | 3/1998 | Hamaguchi et al. | |
| 5,731,844 A | 3/1998 | Rauch et al. | |
| 5,781,246 A | 7/1998 | Alten et al. | |
| 5,784,095 A | 7/1998 | Robbins et al. | |
| 5,793,438 A | 8/1998 | Bedard | |
| 5,805,763 A | 9/1998 | Lawler et al. | |
| 5,828,419 A | 10/1998 | Bruette et al. | |
| 5,844,620 A | 12/1998 | Coleman et al. | |
| 5,900,915 A | 5/1999 | Morrison | |
| 6,037,995 A | 3/2000 | Ichifuji et al. | |
| 6,133,962 A | 10/2000 | Proehl et al. | |
| 6,163,345 A | 12/2000 | Noguchi et al. | |
| 6,166,778 A | 12/2000 | Yamamoto et al. | |
| 6,177,931 B1 | 1/2001 | Alexander et al. | |
| 6,239,794 B1 | 5/2001 | Yuen et al. | |
| 7,158,188 B1 | 1/2007 | Ichifuji et al. | |
| 7,289,158 B2 | 10/2007 | Ichifuji et al. | |

FOREIGN PATENT DOCUMENTS

| | | |
|---|---|---|
| EH | 0 620 517 | 10/1994 |
| EP | 0 266 144 | 5/1988 |
| EP | 0 353 756 | 2/1990 |
| EP | 0669761 | 8/1995 |
| JP | 02-043674 | 2/1990 |
| JP | 02-043675 | 2/1990 |
| JP | 4-76791 | 3/1992 |
| JP | 07-284035 | 10/1995 |
| JP | 11-505097 | 5/1999 |
| WO | 92/04801 | 3/1992 |
| WO | 95/28799 | 10/1995 |
| WO | 95/32587 | 11/1995 |
| WO | WO 95/32583 | 11/1995 |
| WO | WO 95/32585 | 11/1995 |
| WO | 96/07270 | 3/1996 |
| WO | 96/07270 A1 | 3/1996 |
| WO | 96/9721 | 3/1996 |
| WO | 97/18670 | 5/1997 |

OTHER PUBLICATIONS

S. Harris, "Pioneering the synergy of Macs", MacWEEK, vol. 9, No. 11, Mar. 13, 1995, p. 18, Ziff David Publishing.
VideoGuide User's Manual, Part #030, 10011, revision 1.0, 1995, VideoGuide, Inc., (27 pages).
Video Guide Inc., "Video Guide User's Manual", 1995, pp. 1-28.
Bos et al., "The CSS Layout Language", Dec. 20, 1995, pp. 1-6.
JP Office Action for JP Application No. 2010-116894, issued on Oct. 2, 2012.
Digital Satellite Receiver Operating Instructions; 1995 by Sony Corporation; pp. 1-92.
DirecTV-Satellite Receiver User Manual (Philips); pp. 1-43.
*A0020-20100722_Hitachi* vs *TPV(TX)_Complaint* Complaint.
*A0070-20101129_TPV* vs *Hitachi(TX)_Answers_by TPV* TPV Defendant's Answer to Plaintiffs' Complaint, Affirmative Defenses, and Counterclaims.
*A0070-20101129_TPV* vs *Hitachi(TX)_Answers_by Vizio* Vizio, Inc.'s Answer to Complaint and Counterclaims.
*A0110-20120511_TPV+Vizio* vs *Hitachi(TX)_Infringement Contentions_by_Hitachi* Plaintiffs Hitachi Consumer Electronics Co. Ltd.'s and Hitachi Advanced Digital, Inc.'s Disclosure of Asserted Claims and Infringement Contentions Under Patent Rule 3-1.
Exhibit E—Infringement Contentions—U.S. Appl. No. 6,037,995.
A0140-20120605_Hitachi_Amended_Complaint(TX)_Amended_Complaint First Amended Complaint.
A0190-20120804-5_Invalidity_Contentions_from_Defendants Defendants' Invalidity Contentions.
Appendix D to Defendants' Invalidity Contentions.
A0330-20121114_Markman_Order_by_Court Memorandum Opinion and Order.

BROADCASTING AND COMMUNICATION RECEIVER APPARATUS

CROSS-REFERENCE TO RELATED APPLICATIONS

This is a continuation of U.S. application Ser. No. 11/502,403, filed Aug. 11, 2006 now U.S. Pat. No. 8,009,233, which is a continuation of U.S. application Ser. No. 10/773,307, filed Feb. 9, 2004 (now U.S. Pat. No. 7,289,158), which is a continuation of U.S. application Ser. No. 09/418,822, filed Oct. 15, 1999 now U.S. Pat. No. 7,158,188, which is a continuation of U.S. application Ser. No. 08/844,431 filed Apr. 18, 1997 (now U.S. Pat. No. 6,037,995). This application relates to and claims priority from Japanese Patent Application No. 8-097993, filed on Apr. 19, 1996. The entirety of the contents and subject matter of all of the above is incorporated herein by reference.

BACKGROUND OF THE INVENTION

The present invention relates to a broadcasting and communication receiver apparatus which receives information about a transmission program together with video and audio data, decodes and displays the program-associated data and more particularly, to a receiver apparatus which can display program-associated information.

In a prior art television signal receiver apparatus, program information such as the title, start and end times of a broadcasting program has not been transmitted together with video and/or audio signal and thus it has been impossible to display these information on a television display screen. For this reason, TV viewers have acquired these information from a program schedule chart run in newspaper.

Further, digital broadcasting has been being started in which digitized signals in place of conventional analog TV signals are transmitted to each home via satellite, cable or land-based broadcasting. Satellite broadcasting has been already realized in such a manner and, even in Japan, plans have been already in the works for start of such service. In the digital broadcasting, various sorts of additional information can be transmitted simultaneously with digitized video and audio signals. When such additional information can be used to prepare a program schedule chart.

Meanwhile, even in the conventional analog broadcasting, when such a system is employed that program-associated information is multiplexed during vertical blanking interval, a program chart similar to that in the digital broadcasting case can be prepared.

FIG. 1 is a block diagram of a multiplex system of an analog broadcasting type, in which S.sub.A denotes an audio signal, S.sub.V a video signal, S.sub.P program-associated information such as a title, start and end times of a broadcasting program. Reference number 1 denotes a multiplexer for multiplexing the video signal S.sub.V and the program-associated information S.sub.P, numeral 2 denotes a modulator for modulating the video signal S.sub.V and the audio signal S.sub.A into broadcasting electromagnetic wave.

In the analog broadcasting system, there is employed a method for multiplexing the program-associated information S.sub.P during the vertical blanking interval. However, the amount of information capable of multiplexing during the vertical blanking interval is small when compared with the amount of information transmittable in the digital broadcasting system. In the analog broadcasting system, further, with respect to its screen displaying function, its screen displaying ability as well as the amount of information to be handled are restricted. Therefore, the display screen implemented based on the analog broadcasting system is inferior in presentation ability to that based on the digital broadcasting system.

FIG. 2 is a block diagram of a multiplex system of a digital broadcasting type, in which reference symbols 3.sub.A, 3.sub.B and 3.sub.P denote encoders for encoding the audio and video signals and program-associated information respectively. In the digital broadcasting system, the audio signal S.sub.A, video signal S.sub.V and program-associated information S.sub.P are encoded and compressed respectively by the encoders 3.sub.A, 3.sub.B and 3.sub.P, and then subjected by the multiplexer 1 to a time division multiplexing operation to obtain a multiplexed signal. The multiplexed signal is modulated by the modulator 2 into broadcasting electromagnetic wave.

The digital broadcasting system is featured in that, since the program-associated information S.sub.P is encoded and compressed by the encoder 3.sub.P, more signals can be multiplexed than the program-associated information multiplexable in the analog broadcasting system.

When it is desired to display such program-associated information as program chart on a predetermined display zone of a display screen, e.g., a television display screen, if a display zone necessary for full display of all the display data is larger than the predetermined display zone, then all the display data cannot be fully displayed on the limited display zone. For this reason, there disadvantageously occurs such a situation that part of the originally-displayable information is missing.

SUMMARY OF THE INVENTION

It is therefore a major object of the present invention to display the entire display data on specific information selected by a viewer or to add an information correcting display when the display data is missing to thereby allow the information of the display data to be presented within a limited display zone of a display screen.

Another object of the present invention is to eliminate the need for newspapers and magazines carrying program-associated information.

In accordance with an aspect of the present invention, there is provided a broadcasting and communication receiver apparatus which comprises a receiver means for receiving at least program-associated information including title, start and end times of a broadcast program together with a video signal and a audio signal; a decoder means for decoding the program-associated information from the received signal; a screen display means for processing and displaying the decoded program-associated information on a display screen; a command receiver means for receiving an input signal from a remote controller or from a key or keys provided to a main body of the receiver apparatus; and a display controller means for controlling the display screen based on the input signal.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Embodiments of the present invention will be explained with reference to the accompanying drawings.

Figure 1:
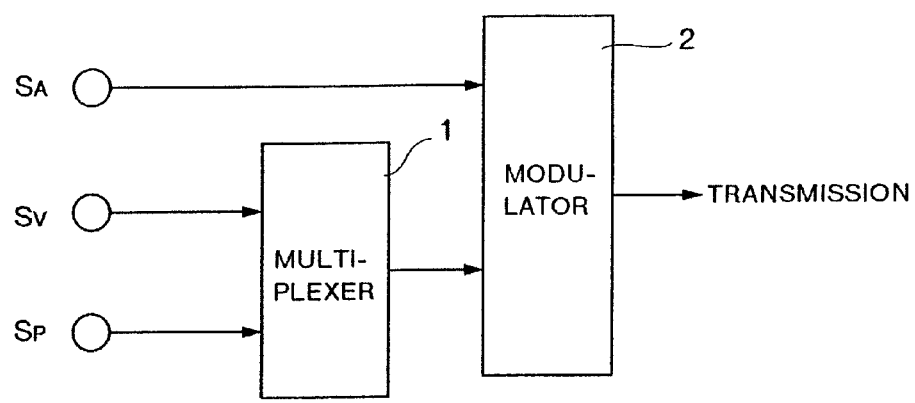
FIG. 1 is a block diagram of a multiplex system of an analog broadcasting type.
Figure 2:
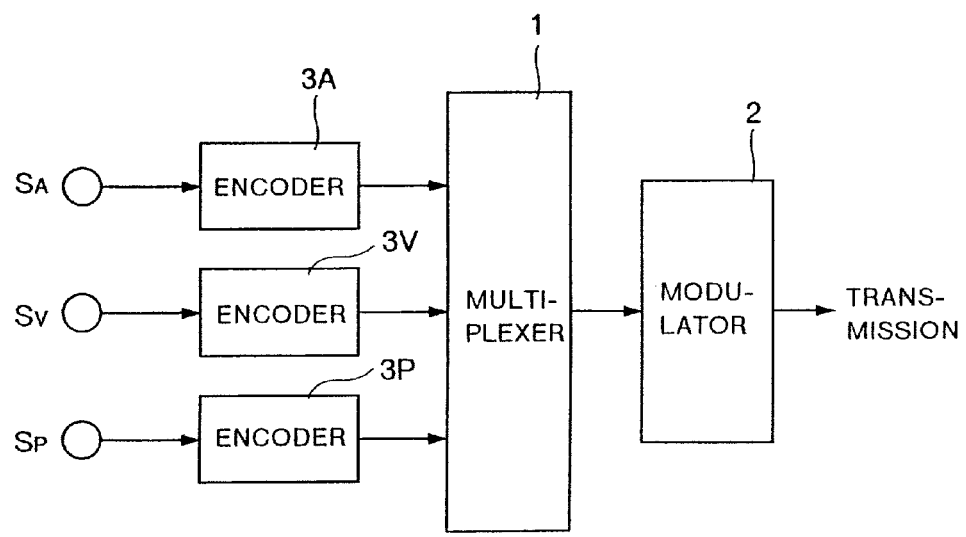
FIG. 2 is a block diagram of a multiplex system of a digital broadcasting type.
Figure 3:
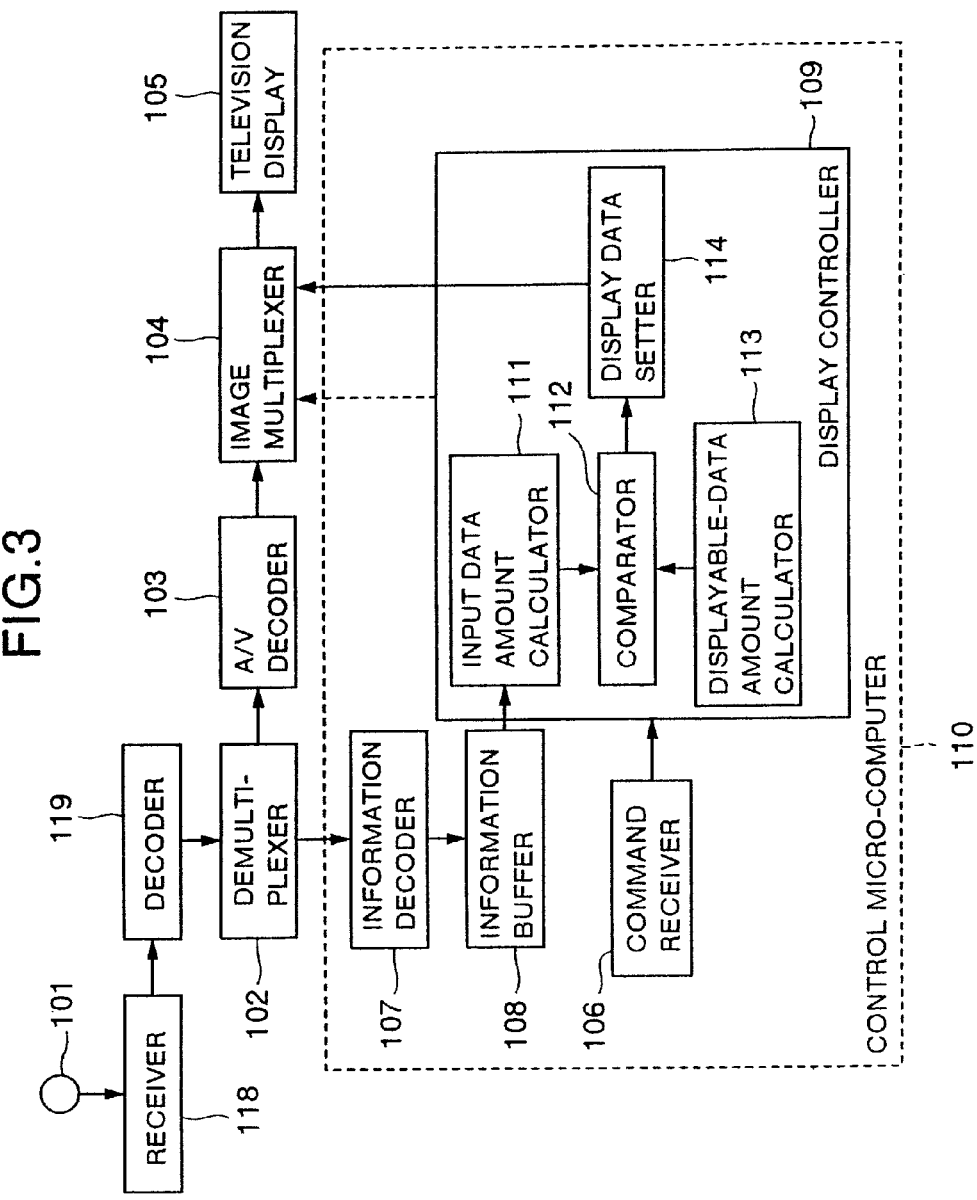
FIG. 3 is a block diagram of a broadcasting and communication receiver apparatus in accordance with a first embodiment of the present invention.

FIG. 3 is a block diagram of a broadcasting and communication receiver apparatus in accordance with an embodiment of the present invention, which includes an input terminal 101 for input of broadcasting and communication signals from an external antenna or the like, a separator or demultiplexer 102 for extracting any one of video and audio signals and program-associated information signal from the received signal, a NV decoder 103 for decoding the video and audio signals to reproduce original image and original audio, an image multiplexer 104 for multiplexing the video signal and such graphics as characters, a television display 105, a command receiver 106 for receiving a user input, an information decoder 107 for decoding the transmitted program-associated information, a program-associated information buffer 108 for holding therein the decoded program-associated information, a control micro-computer 110 containing the above elements 106 to 109, an input data amount calculator 111 for calculating the amount of display data received from the information buffer, displayable-data amount calculator 113 for calculating the number of character rows capable of being displayed on the display screen, a comparator 112 for comparing the amount of input data with the amount of displayable data, a display data setter 114 for setting character rows to be displayed, and a display controller 109 containing the above elements 111 to 114 for controlling the image multiplexer. Further included in the broadcasting and communication receiver apparatus are a receiver 118 for receiving broadcasting and communication signals and a decoder 119 for decoding the received signals.

In FIG. 3, a signal applied to the input terminal 101 is sent to the demultiplexer 102 through the receiver 118 and decoder 119. The demultiplexer 102 extracts video and audio signals from the received signal and sends them to the A/V decoder 103. Similarly, the demultiplexer 102 also extracts program-associated information from the received signal and sends it to the information decoder 107 of the control micro-computer 110. Program-associated information decoded by the information decoder 107 is sent to the program-associated information buffer 108.

When a signal indicative of a request of displaying the program-associated information is input to the command receiver 106, the program-associated information held in the program-associated information buffer 108 is sent to the input data amount calculator 111 of the display controller 109. The comparator 112 of the display controller 109 compares the number of character rows calculated by the input data amount calculator 111 with the number of displayable character rows calculated by the displayable-data amount calculator 113, and sends its comparison result and the input data to the display data setter 114 for setting of the display characters. The display controller 109 controls the image multiplexer 104 in such a manner that the image multiplexer 104 multiplexes the display data received from the display data setter 114 and the video signal received from the NV decoder 103 and displays it on the television display 105.

When the number of character rows of the input data is larger than the number of displayable character rows, the display data setter 114 sends as display data to the image multiplexer 104 the displayable character rows of the input data with a symbol indicative of omission added to the tail of last one of the character rows thereof.

Figure 4:
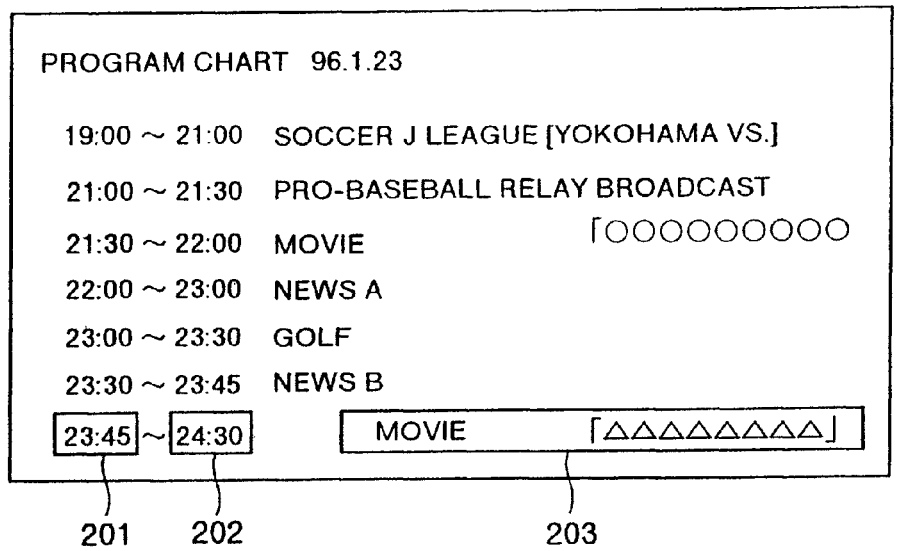
FIG. 4 is an example of a display screen for display of program-associated information for explaining the present invention.

Shown in FIG. 4 is an example of a display screen for display of program-associated information for explaining the present invention, in which reference numeral 201 denotes a program start time, numeral 202 denotes a program end time, and 203 denotes a program title. In the example of the program-associated information display screen of FIG. 4, the start and end times 201 and 202 and title 203 of the program are arranged in a row to express its program broadcasting schedule, but a display zone for displaying the program title 203 is too narrow to display all the program title 203 on the screen until its very end.

In particular, when the system is required to express in Japanese (Kanji), it is necessary to make large the size of Kanji characters for its expression, which results in that the number of character rows displayable within the display zone is decreased and thus all the display data cannot be fully displayed.

Figure 5:
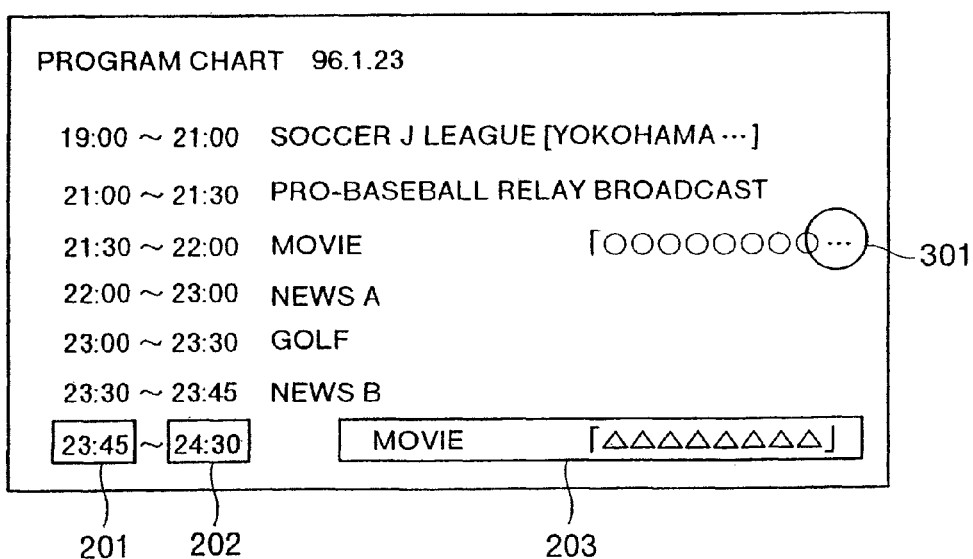
FIG. 5 is a first example of the program-associated information display screen in FIG. 3.

FIG. 5 is a first example of the program-associated information display screen in FIG. 3. In FIG. 5, numeral 301 denotes an omission symbol indicative of the fact that a tail part of the display data is omitted.

In the case of the program-associated information display screen of FIG. 4, it is impossible to judge whether the display data such as the program title is fully displayed to its very end or displayable character rows alone of the display data are displayed. In the case of the program-associated information display screen of FIG. 5, on the other hand, when displayable character rows alone of the display data are displayed, the omission symbol 301 indicative of omission of the tail part of the display data is attached to the last tail of the display character row, whereby a viewer can clearly know it. Although " . . . " has been employed as the omission symbol in the program-associated information data screen of FIG. 5, another suitable symbol may be used as necessary. Further, contents to be displayed is not limited to such program-associated information as the program start time 201, program end time 202 and program title 203, but other information may be allowed.

Figure 6:
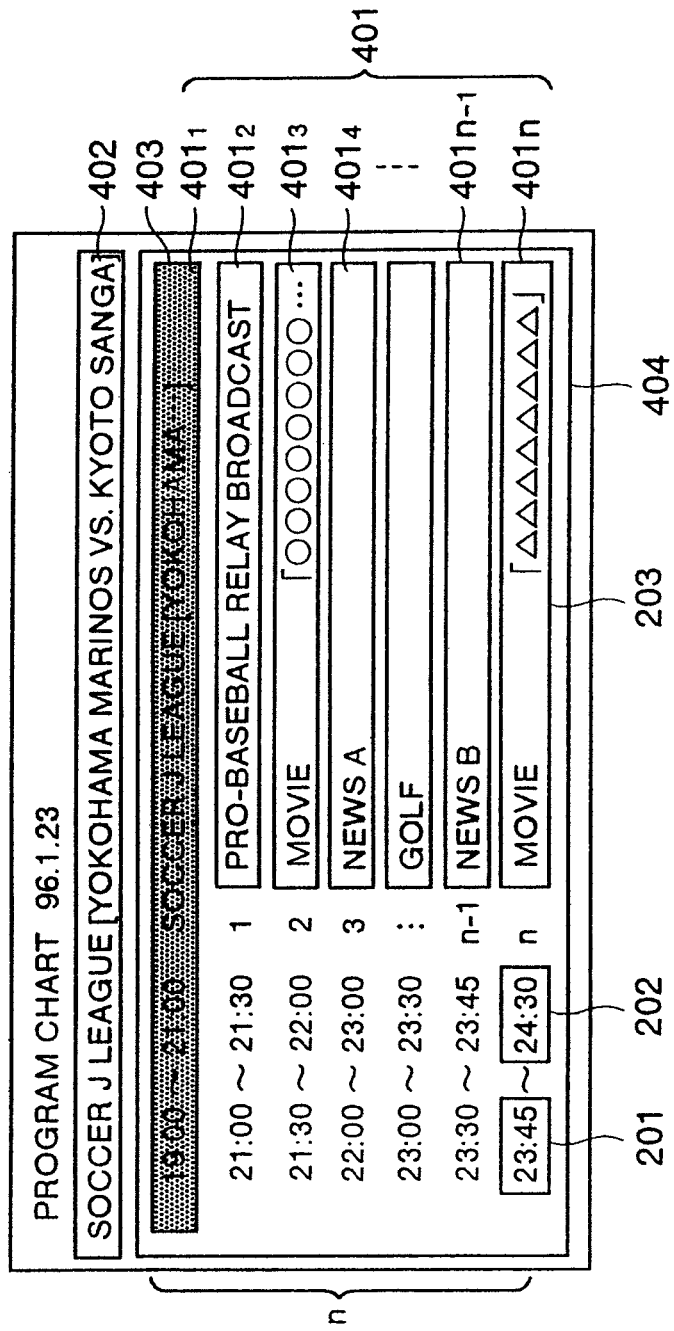
FIG. 6 is a second example of the program-associated information display screen in FIG. 3.

FIG. 6 shows a second example of the program-associated information display screen in FIG. 3, in which numeral 401 denotes a first display zone made up of n program display areas 401.sub.1, 401.sub.2, . . . , 401.sub.n-1, and 401.sub.n, 402 denotes a second display zone, 403 denotes a cursor for selecting either one of the n program display areas 401.sub.1, 401.sub.2, . . . , 401.sub.n-1 in the first display zone, and 404 denotes a display zone in which a plurality (1, . . . , and n) of the first display zones 401 are arranged.

Displayed on the first display zone 401 is at least part of display data including program title. Displayed on the second display zone 402 are the same display data including program titles as displayed on the first display zone 401 fully without any omission. The cursor 403, in response to a user input signal, selects desired one of the n program display areas in the first display zone 401. In this way, since the operation of the cursor 403 causes the user to arbitrarily select the specific first display zone 401 (for example, 4011) from the first display zone 401 arranged in the alternative display zone 404, all the display data including program title required by the user can be fully displayed without any omission.

Since only the display data required by the user are displayed without any omission on the second display zone 402 and display data are displayed with an omission symbol on the first display zone 401; more first display zones can be displayed within the alternative display zone 404.\

Figure 7:
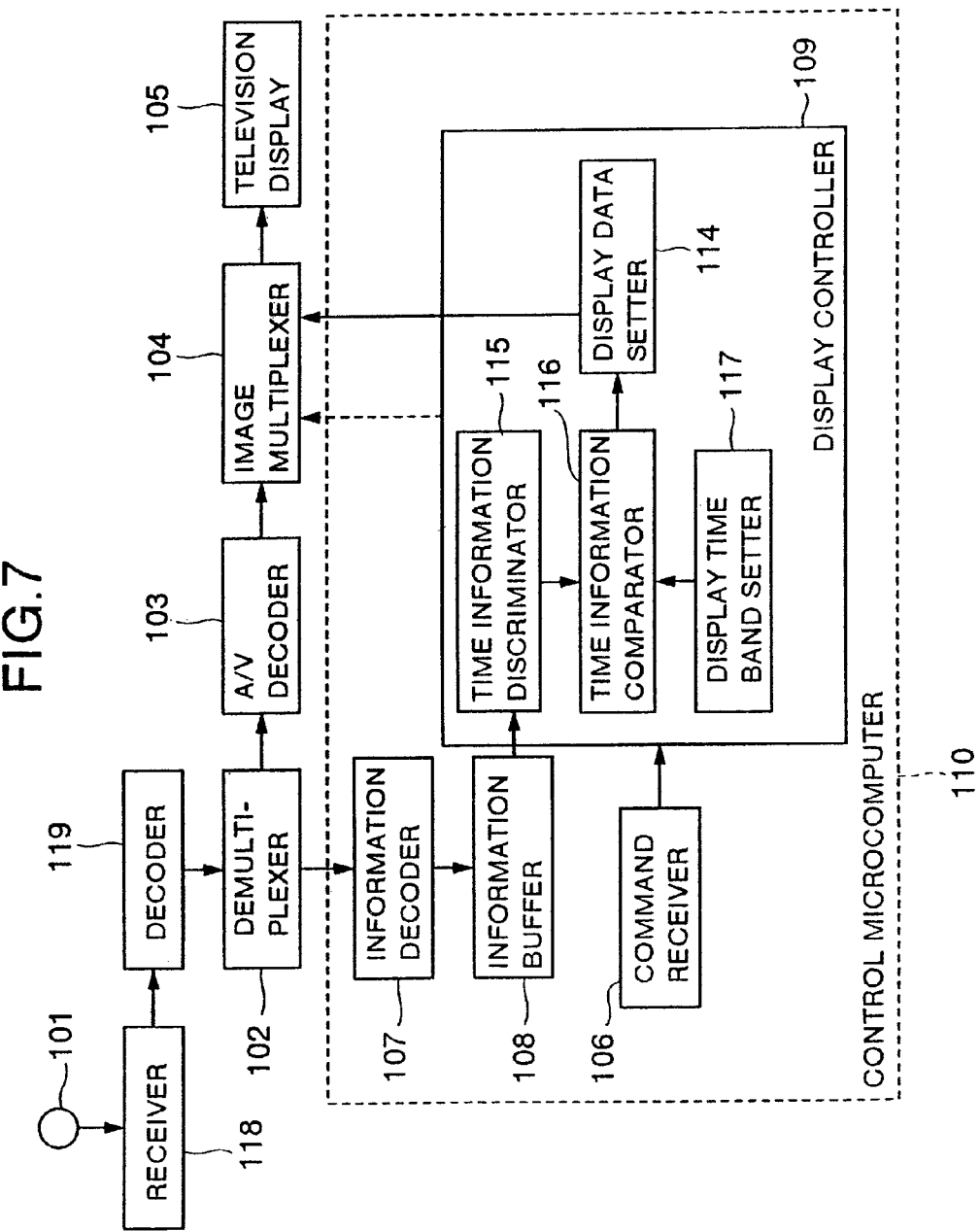
FIG. 7 is a block diagram of a broadcasting and communication receiver apparatus in accordance with a second embodiment of the present invention.

Turning to FIG. 7, there is shown a block diagram of a broadcasting and communication receiver apparatus in accordance with a second embodiment of the present invention, which includes a time information discriminator 115 for discriminating time information of input data, a display time band setter 117 for setting a time band of a program chart to be displayed on the display screen, and a time information comparator 116 for comparing the time information of the input data with the time band of the program chart. Other constituent elements are the same as those in FIG. 3.

When a signal indicative of a request of displaying program-associated information on the display screen is input to the command receiver 106, the program-associated information hold in the program-associated information buffer 108 is sent therefrom to the time information discriminator 115 of the display controller 109, The time information comparator 116 of the-display controller 109 compares the time information discriminated by the time information discriminator 115 with the display time band set by the display time band setter 117, and sends its comparison result and the input data to the display data setter 114 where their display format is set. The display controller 109 controls the image multiplexer 104 and composes the display data received from the display data setter and the video signal received from the NV decoder 103 to display it on the television display 105.

The above program-associated information display screen has such a display format that uses at least character string in each information field and background, that is, shows such a program chart indicative of program broadcasting schedule that a program start time is given at the left end of each program name field and a program end time is given at the right end of each information field.

When the time information of the input data is judged to be out of a display time band range, the display data setter 114 modifies the shape of the left or right end of the display data and sends it to the image multiplexer 104. The display data setter 114 modifies the shape of the left or right end of the program name field to clearly indicate that the start or end time of the program is located out of the time band range of the program chart being displayed.

Figure 8:
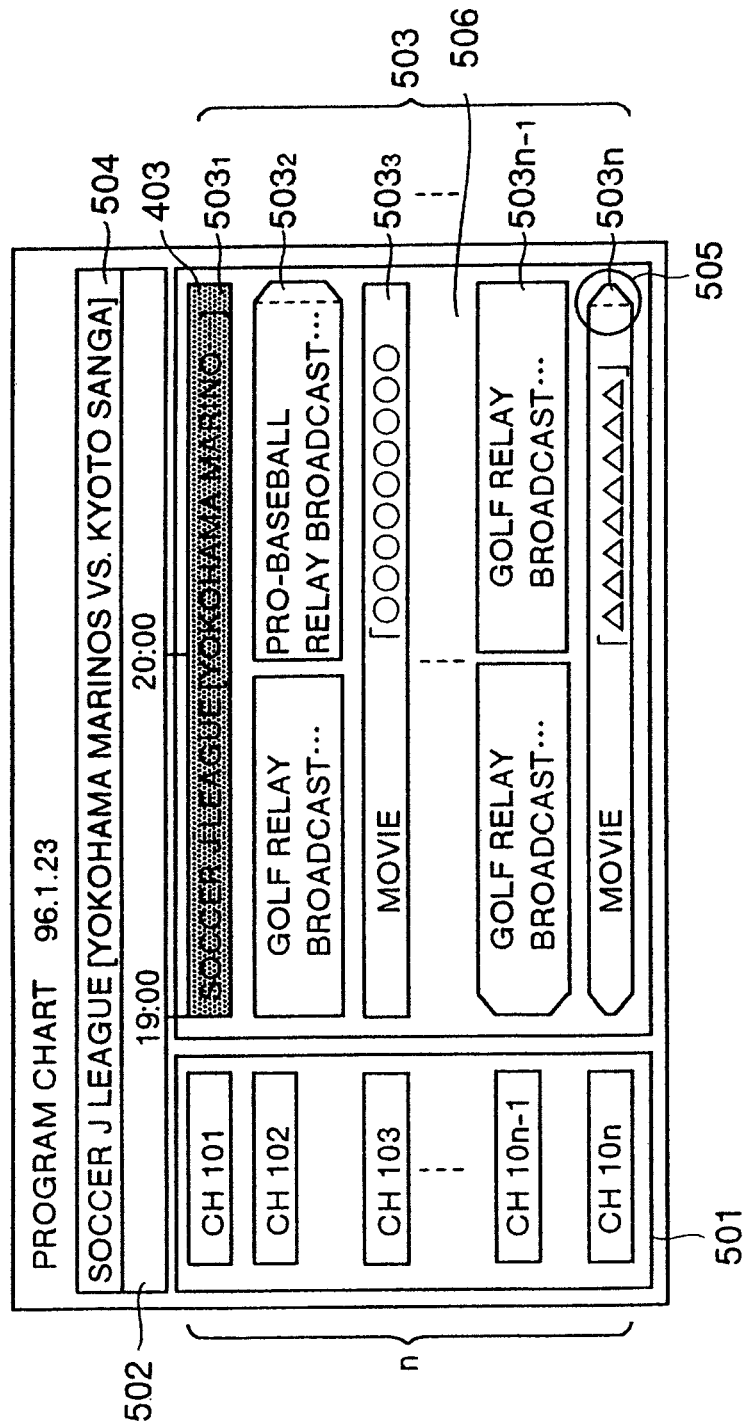
FIG. 8 is a third example of a display screen for display of program-associated information in FIG. 7.

FIG. 8 shows a third example of the program-associated information display screen in FIG. 7, which includes a channel number column 501, a time scale column 502, first program name display column 503 indicative of n-channel program display zones 503.sub.1, 503.sub.2, ... 503.sub.n−1 and 503.sub.n, a second program name display column 504, a continuation display pattern 505 indicative of the fact that a program broadcast start or end time is located out of the program chart being displayed, and a program name alternative column 506 in which a plurality (n=1, ... ) of the first program name display columns 503 are arranged.

In the program display screen, abscissa denotes time, a display start position of the first program name display column 503 in the horizontal direction indicates a broadcast start time, and its horizontal length indicates a program broadcast duration. A measure of time is expressed in the time scale column 502.

Further, ordinate indicates broadcast channel. Displayed on the channel number column 501 are channel numbers of broadcasting stations, names or logo marks of the broadcasting stations.

The user operates the cursor 403 using a remote controller or a key or keys provided on the main body of the receiver apparatus to select one of the first program name display columns 503.sub.1, 503.sub.2, ... and 503.sub.n displayed within the program name alternative column 506. The selected first program name display column 503 is also displayed in the second program name display column 504. More specifically, at least part of the program title is displayed on the first program name display column 503, whereas, all the program title is wholly displayed without any omission on the second program name display column 504.

The broadcast start time, broadcast duration or broadcast end time of a program is expressed based on a measure of a time displayed in the time scale column 502. However, when the program broadcast duration is longer than a duration expressible on the program chart screen or when the program broadcast star or end time is located out of the time band expressed in the program chart being displayed, it is impossible to express the program broadcast start or end time within the program chart display screen. For the purpose of expressing that the program broadcasting starts with a time earlier than the time band being displayed or that the program broadcasting ends in a time later than the time band being displayed; the continuation display pattern 505 is used.

By using the continuation display pattern 505, when the broadcast duration is overlapped as located ahead or behind the time band being displayed, it is possible to express that the broadcast start or end time is out of the time band being displayed.

Figure 9:
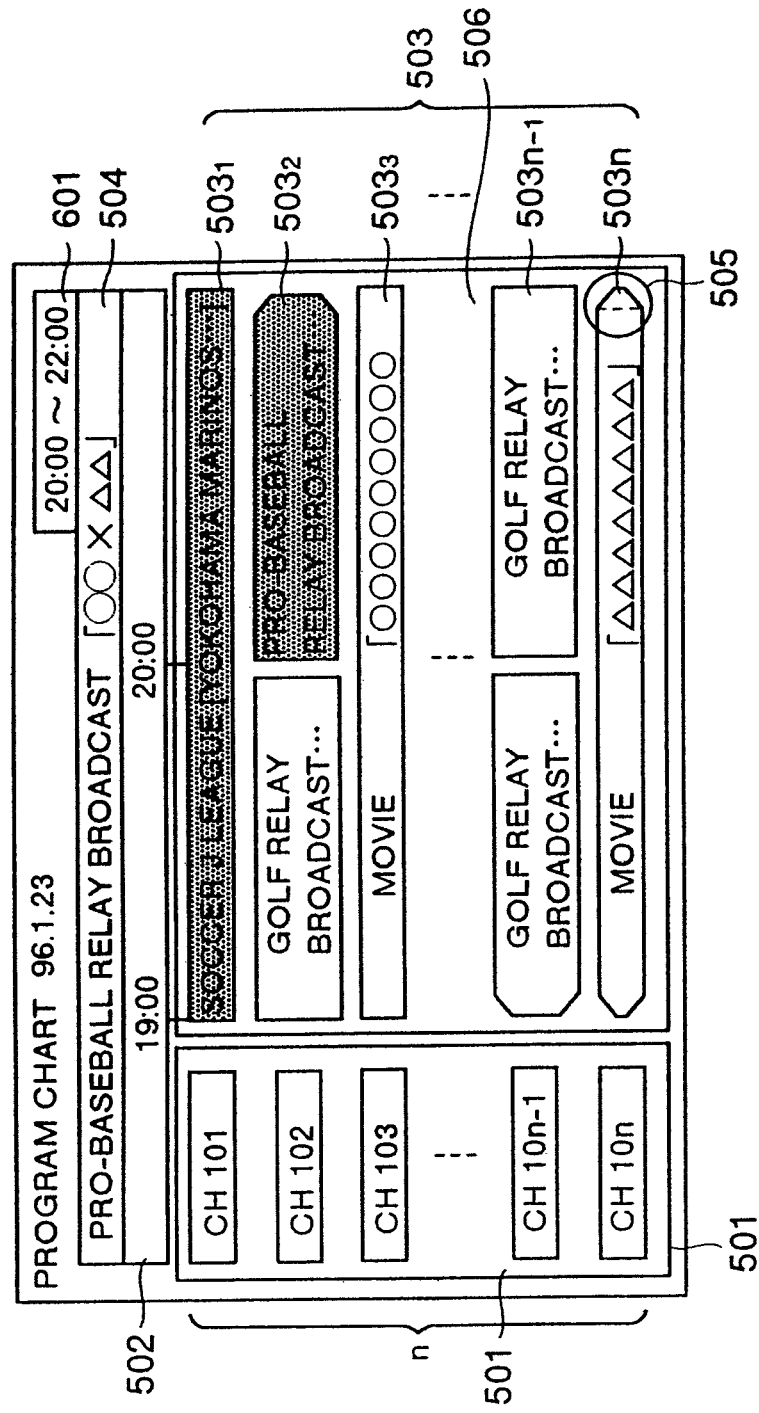
FIG. 9 is a fourth example of the program-associated information display screen in FIG. 7.

Shown in FIG. 9 is a fourth example of the program-associated information display screen in FIG. 7, which includes a third time information display column 601.

On the program display screen, the third time information display column 601 is provided within the program-associated information display screen to express therein broadcast start and end times of a program. Therefore, when the program broadcast duration is longer than a duration displayable on the program display screen so that the program broadcast start or time cannot be expressed within the time scale column 502 of the program chart screen; it is possible to clearly display the broadcast start and end times, i.e., the time information of the received program-associated information without any omission.

The time information display column 601 may be an independent display zone or may be provided within the second program name display column 504 to be expressed together with the program title.

Although explanation has been made in connection with the program display screen based on the digital broadcasting system in the present embodiment, the present invention is not limited to the specific digital broadcasting system but may be applied to such a broadcasting system that the program-associated information is transmitted as multiplexed to the conventional analog television broadcasting system. Further, the present invention is not restricted to the program chart display screen but may be applied to other general display one.

In accordance with the present invention, there can be provided, when it is desired to display information associated with an item selected condition, a program-associated information display screen of a broadcasting and communication receiver apparatus, on which all display data of the program-associated information received by the receiver apparatus are fully displayed without any omission.

Further, the user can eliminate the need for purchasing newspapers or magazines-carrying the program-associated information.

The invention claimed is:

1. A digital receiver comprising:
   a receiver which receives video program and program information at least including a title of a video program and time information;
   a decoder which decodes the program information;
   a display unit which displays at least the program information; and
   a display controller which controls display of a display zone shown on the display unit, the display zone in which at least a part of the title included in the program information is displayed under control of the display controller;
   wherein the display zone is displayed in a program information display which displays the display zone corresponding to a video program with a start time and an end time of the video Program without displaying a time scale,
   wherein the display controller includes an input data amount calculator to calculate a number of characters of input data for the display zone, and a comparator to compare the number of characters of the input data as calculated by the calculator, with a number of characters of displayable data in the display zone,
   wherein the number of characters of displayable data is changed depending on a size of characters of the input data,
   and wherein, even if the display zone has an area for no more lines of characters than only one line of characters to be displayed when the number of characters of the input data is larger than the number of characters of the displayable data in the display zone, both a part of the title and a symbol indicative of omission are displayed without line feed in the area of the only one line of characters.

2. The digital receiver according to claim 1, further comprising:
   a memory which stores the program information which is decoded by the decoder;
   wherein the input data amount calculator calculates a number of characters of a data for the display zone which is input from the memory.

3. The digital receiver according to claim 1, wherein the time information is information based upon which the start time and the end time of the video program can be calculated.

4. The digital receiver according to claim 1, wherein the program information display is more particularly displayed without displaying an equally-incremented time scale axis.

5. A digital receiver comprising:
   a receiver which receives video program, title information of a video program, and time information;
   a decoder which decodes the title information;
   a display unit; and
   a display controller which controls display of a display zone shown on the display unit, the display zone in which at least a part of the title information is displayed under control of the display controller;
   wherein the display zone is displayed in a program information display which displays the display zone corresponding to a video program with a start time and an end time of the video program without displaying a time scale,
   wherein the display controller includes an input data amount calculator to calculate a number of characters of a data for the display zone, and a comparator to compare the number of characters of the input data calculated by the calculator with a number of characters of displayable data in the display zone,
   wherein the number of characters of displayable data is changed depending on a size of characters of the input data,
   and wherein, even if the display zone has an area for no more lines of characters than only one line of characters to be displayed when the number of characters of the input data is larger than the number of characters of the displayable data in the display zone, both a part of the title information and a symbol indicative of omission are displayed without line feed in the area of the only one line of characters.

6. The digital receiver according to claim 1, further comprising:
   a memory which stores the title information which is decoded by the decoder;
   wherein the input data amount calculator calculates a number of characters of a data for the display zone which is input from the memory.

7. The digital receiver according to claim 5, wherein the time information is information based upon which the start time and the end time of the video program can be calculated.

8. A digital receiver comprising:
   a receiver which receives video program and program information at least including a title of a video program and time information;
   a decoder which decodes the program information;
   a display unit which displays at least the program information; and
   a display controller which controls display of a display zone shown on the display unit, the display zone in which at least a part of the title included in the program information is displayed under control of the display controller;
   wherein the display zone is displayed in a program information display which displays the display zone corresponding to a video program with a start time and an end time of the video Program without displaying a time scale,
   wherein the display controller determines replacement of a part of the program information by an omission symbol, by taking into account an amount of data displayable in the display zone, an amount of the program information, and a character type of a character included in the program information,
   and wherein, even if the display zone has an area for no more lines of characters than only one line of characters to be displayed when the display controller replaces a part of the program information by an omission symbol, both a part of the title information and an omission symbol are displayed without line feed in the area of the only one line of characters.

9. The digital receiver according to claim 8, further comprising:
   a memory which stores the program information which is decoded by the decoder.

10. The digital receiver according to claim 8, wherein the time information is information based upon which the start time and the end time of the video program can be calculated.

11. A digital receiver comprising:
a receiver which receives video program, title information of a video program and time information;
a decoder which decodes the title information;
a display unit; and
a display controller which controls display of a display zone shown on the display unit, the display zone in which at least a part of the title information is displayed under control of the display controller;
wherein the display zone is displayed in a program information display which displays the display zone corresponding to a video program with a start time and an end time of the video program without displaying a time scale,
wherein the display controller determines replacement of a part of the title information by an omission symbol by taking into account an amount of data displayable in the display zone, an amount of the title information, and a character type of a character included in the title information;
and wherein, even if the display zone has an area for no more lines of characters than only one line of characters to be displayed when the display controller replaces a part of the program information by an omission symbol, both a part of the title information and an omission symbol are displayed without line feed in the area of the only one line of characters.

12. The digital receiver according to claim 11, further comprising:
a memory which stores the title information which is decoded by the decoder.

13. The digital receiver according to claim 11, wherein the time information is information based upon which the start time and the end time of the video program can be calculated.

14. A digital receiver comprising:
a receiver which receives video program and program information including a title of a video program and time information;
a decoder which decodes the program information;
a display unit which displays at least the program information; and
a display controller which controls display of a display zone shown on the display unit, the display zone in which at least a part of the title included in the program information is displayed under control of the display controller;
wherein the display zone is displayed in a program information display which displays the display zone corresponding to a video program with a start time and an end time of the video program without displaying a time scale,
wherein the display controller determines whether a part of the title does not fit in the display zone by taking into account display size of the title that varies depending on the size of a character included in the title,
and wherein, even if the display zone has an area for no more lines of characters than only one line of characters to be displayed when the title does not fit in the display zone, the display controller replaces a tail part of the title by an omission symbol and both the remaining part of the title and the omission symbol are displayed without line feed in the area of the only one line of characters.

15. The digital receiver according to claim 14, further comprising:
a memory which stores title information which is decoded by the decoder.

16. The digital receiver according to claim 14, wherein the time information is information based upon which the start time and the end time of the video program can be calculated.

17. A digital receiver comprising:
a receiver which receives video program, title information of a video program and time information;
a decoder which decodes the title information;
a display unit; and
a display controller which controls display of a display zone shown on the display unit, the display zone in which at least a part of the title information is displayed under control of the display controller;
wherein the display zone is displayed in a program information display which displays the display zone corresponding to a video program with a start time and an end time of the video program without displaying a time scale,
wherein the display controller determines whether the title information does not fit in the display zone by taking into account display size of the title information that varies depending on the size of a character included in the title information,
and wherein, even if the display zone has an area for no more lines of characters than only one line of characters to be displayed when the title information does not fit in the display zone, the display controller replaces a tail part of the title information by an omission symbol and both the remaining part of the title information and the omission symbol are displayed without line feed in the area of the only one line of characters.

18. The digital receiver according to claim 17, further comprising:
a memory which stores the title information which is decoded by the decoder.

19. The digital receiver according to claim 17, wherein the time information is information based upon which the start time and the end time of the video program can be calculated.

* * * * *